(12) United States Patent
Yasui

(10) Patent No.: US 6,422,598 B1
(45) Date of Patent: Jul. 23, 2002

(54) OCCUPANT PROTECTING APPARATUS

(75) Inventor: Katsuaki Yasui, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/843,770

(22) Filed: Apr. 30, 2001

(30) Foreign Application Priority Data

Oct. 11, 2000 (JP) ........................................ 2000-310458

(51) Int. Cl.⁷ .............................................. B60R 21/32
(52) U.S. Cl. ..................................................... 280/735
(58) Field of Search ........................ 280/735; 180/271, 180/282; 701/45

(56) References Cited

U.S. PATENT DOCUMENTS

| | | | |
|---|---|---|---|
| 4,625,329 A | * 11/1986 | Ishikawa et al. | 180/271 |
| 5,118,134 A | 6/1992 | Mattes et al. | 280/735 |
| 5,670,853 A | * 9/1997 | Bauer | 180/273 |
| 5,702,123 A | * 12/1997 | Takahashi et al. | 280/735 |
| 5,845,000 A | * 12/1998 | Breed et al. | 348/143 |
| 6,007,095 A | * 12/1999 | Stanley | 280/730.1 |
| 6,027,138 A | * 2/2000 | Tanaka et al. | 280/735 |
| 6,113,137 A | * 9/2000 | Mizutani et al. | 280/734 |
| 6,196,579 B1 | * 3/2001 | Bowers et al. | 280/730.1 |
| 6,302,438 B1 | * 10/2001 | Stopper et al. | 280/735 |

FOREIGN PATENT DOCUMENTS

| | | | |
|---|---|---|---|
| JP | 10-100858 | 4/1998 | ........... B60R/21/32 |
| JP | 11-217056 | 8/1999 | ........... B60R/21/32 |

* cited by examiner

Primary Examiner—Brian L. Johnson
Assistant Examiner—Tony Winner
(74) Attorney, Agent, or Firm—Sughrue Mion, PLLC

(57) ABSTRACT

An occupant protecting apparatus capable of safely controlling the operation method with a simple structure. The occupant protecting apparatus comprises infrared beam emitting device (11) disposed on an upper portion of an occupant room of a vehicle at a position diagonally rearward of a position of a passenger seat for emitting an infrared beam, an infrared beam detecting device (16) disposed on a position offset from the infrared beam emitting device for detecting a position of a light spot generated in such a manner that flat infrared beam impinges an occupant on a seat and scatters, and a control device for obtaining a size of the occupant or a three-dimensional shape of sitting position or the like from output of the infrared beam detecting device to control motion of a protecting apparatus such as an air bag (3).

13 Claims, 3 Drawing Sheets

OCCUPANT PROTECTING APPARATUS

CROSS REFERENCE TO RELATED APPLICATION

This application is based on Application No. 2000-310458, filed in Japan on Oct. 11, 2000, the contents of which are hereby incorporated by reference.

TECHNICAL FIELD

The present invention relates to an occupant protecting apparatus such as an air bag system used for protecting an occupant at the time of collision of an automobile.

BACKGROUND ART

An air bag immediately expands between an occupant and a steering wheel or a dashboard at the time of collision of an automobile to protect the occupant. However, when a distance between the occupant and the steering wheel or the dashboard, for example, when the driver is small and driving the automobile near the steering wheel, or when a child is standing in front of a passenger seat, it is known that deployment of the air bag may damage the occupant in some cases. Further, when the occupant sitting on the passenger seat is a child younger than seven years old, even if the child is sitting on a normal position, it is safer not to deploy the air bag. For this reason, the United State is going to legislate to provide an occupant detecting apparatus in an occupant protecting apparatus using an air bag.

As the occupant protecting apparatus providing with the occupant detecting apparatus, there is a known apparatus described in Japanese Patent Application Laid-open No.H10-100858. A structure of this apparatus will be explained based on FIG. 6. In FIG. 6, a reference number 1 represents a front window shield 1. A front collision air bag 3 is accommodated in a dashboard 2 provided below the front window shield 1 such as to be opposed to a passenger seat 4. A reference number 5 represents a danger region where the occupant may be injured if the air bag 3 deploys. The dashboard 2 is provided with infrared beam emitting means 11 for emitting infrared beam and infrared beam detecting means 16 having a PSD. The infrared beam emitting means 11 and the infrared beam detecting means 16 constitute position detecting means 20.

Next, operation of this conventional occupant protecting apparatus will be explained. As shown in FIG. 6, infrared beam is emitted diagonally upward from the infrared beam emitting means 11. When there is no person in the danger region 5, e.g., when an adult person is sitting on the passenger seat 4 normally, the infrared beam reaches a ceiling 6 in the occupant room, and an infrared beam spot is made on the ceiling 6. On the contrary, when a person exists in the danger region 5, e.g., when a child stands up in front of the passenger seat 4, since the infrared beam is blocked by the person, the infrared beam spot is made on the person's body. By detecting the position of the infrared beam spot using the infrared beam detecting means 16, a distance between the infrared beam detecting means 16 (i.e., dashboard 2) and the person's body based on the principle of triangulation. When an electronic control unit (ECU) that is not shown judges that the detected distance is extremely small and it is danger to deploy the air bag 3 or when a collision is detected by an acceleration sensor, the air bag 3 is not opened to prevent the occupant from being injured by the air bag 3.

As examples of an occupant protecting apparatus having position detecting means for detecting a distance between a dashboard and a person's body, there are a known apparatus using ultrasound as described in Japanese Patent Application Laid-open No.H11-286256, and a known apparatus using an optical sensor as described in Japanese Patent Application Laid-open No.H11-217056. However, in any of the apparatuses, the position detecting means is provided on the dashboard in front of the occupant or on a front end of a ceiling, and the distance between the dashboard and a front surface of the occupant. Therefore, when the occupant opens a magazine or newspaper, or when the occupant expands his or her hand forward, the system erroneously recognizes that a person exists in the danger region, and there is a problem that the air bag is prevented from opening even when the automobile collides and it is necessary to open the air bag.

Further, the occupant is not always in the normal position, and he or she may be sitting on a laterally deviated position. Therefore, with the method using one infrared beam as in the conventional technique, infrared beam is not emitted to the person's body in some cases.

Further, there is a known method for detecting motion of an occupant at the time of collision by means of the position detecting means to detect the collision, thereby controlling the operation of the occupant protecting apparatus such as an air bag as described in U.S. Pat. No. 5,118,134. However, response sensitivity of a distance sensor and disturbance resistance are not practically sufficient, and this method has not yet been in the actual use. For example, in the case of the distance sensor using ultrasound, the velocity of sound is limited. Therefore, in order to detect a distance of 1 m for example, a response speed can not be faster than 6 ms that is required for sound to reciprocate through 1 m in principle. A position detecting means using the PSD also has a problem that the response speed can not be made faster if normal operation of the position detecting means is secured even when strong disturbance light is applied to the occupant such as direct sunlight.

Further, there is a problem that if not only the longitudinal collision, but also a lateral collision is also to be detected by the position detecting means, another position detecting means for detecting the lateral position is separately required.

SUMMARY OF THE INVENTION

The present invention has been accomplished to solve the above problems, and it is an object of the invention to provide an occupant protecting apparatus capable of safely controlling the operation method with a simple structure.

An occupant protecting apparatus of the present invention comprises infrared beam emitting means disposed on an upper portion of an occupant room of a vehicle at a position diagonally rearward of a position of a passenger seat for emitting infrared beam, infrared beam detecting means disposed on a position offset from the infrared beam emitting means for detecting a position of a light spot generated in such a manner that flat infrared beam impinges an occupant on a seat and scatters, and control means for obtaining a size of the occupant or a three-dimensional shape of sitting position or the like from output of the infrared beam detecting means to control motion of a protecting apparatus such as an air bag.

Infrared beam is emitted using the infrared beam detecting means from a direction diagonally rearward of the position of the occupant's head sitting on the seat, thereby detecting a physique of the occupant or a three-dimensional shape of the sitting position by means of the infrared beam detecting means. Based on the detected result, the operation of the protecting apparatus such as the air bag is controlled by the control means, thereby obtaining a safe occupant protecting apparatus.

The infrared beam emitting means is disposed on a ceiling of the vehicle in the vicinity of a room lamp diagonally rearward of a position of a head of an occupant on a driver's seat or a passenger seat.

The infrared beam emitting means emits flat infrared beam sheet, a set of a plurality of infrared beams arranged in a form of a sheet or infrared beam that scans in a form of a sheet.

The infrared beam detecting means comprises a two-dimensional image sensor disposed on a position offset from the infrared beam emitting means in order to detect the position of the light spot generated in such a manner that the infrared beam sheet or beam impinges the occupant on the seat and scatters.

The infrared beam emitting means includes an anamorphic optical system.

The control means judges whether the occupant is an adult or a child from the size of the head of the occupant detected by the infrared beam detecting means.

The control means judges whether an object is a stationary object such as a child seat from presence or absence of motion of the light spot on the object.

The infrared beam emitting means can emit flat infrared beam sheet, a set of a plurality of infrared beams arranged in a form of a sheet or infrared beam that scans in a form of a sheet to a plurality of vertical positions.

The infrared beam detecting means includes an image sensor having a frame rate of 200 fps or greater in order to detect the position of the light spot generated in such a manner that the infrared beam sheet or beam impinges the occupant on the seat and scatters.

The infrared beam detecting means comprises a two-dimensional CMOS image sensor having a projection function.

The two-dimensional CMOS image sensor functions as a one-dimensional image sensor using the projection function when acceleration of the vehicle exceeds a predetermined value.

The control means detects a collision state from longitudinal motion of the occupant detected by the infrared beam detecting means at an instant when a front collision of the vehicle occurs.

The control means detects a collision state from lateral motion of the occupant detected by the infrared beam detecting means at an instant when a side collision of the vehicle occurs.

DESCRIPTION OF THE PREFERRED EMBODIMENT

Embodiments of the present invention will be explained with reference to the accompanying drawings below.

First Embodiment

Figure 1:
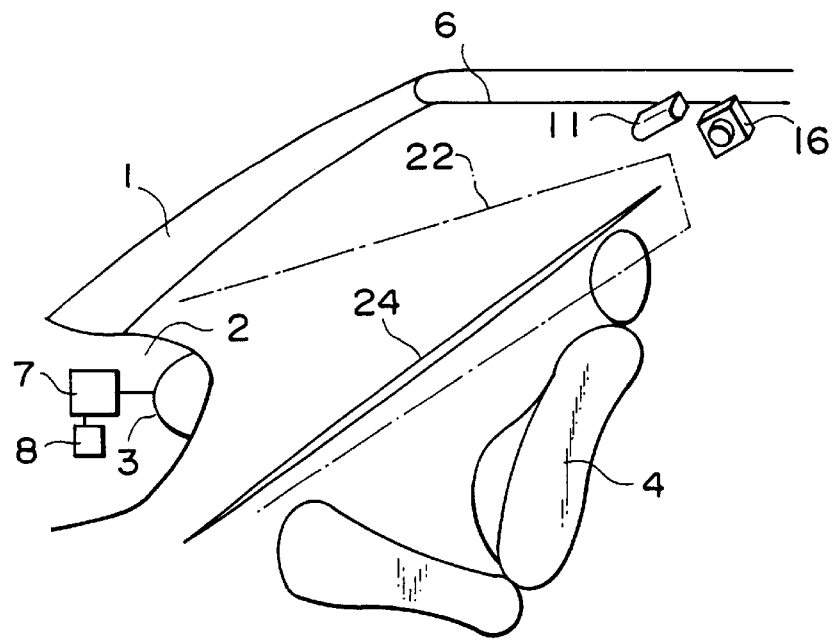
FIG. 1 is a side view showing a schematic structure of an occupant protecting apparatus according to a first embodiment of the present invention.
Figure 2:
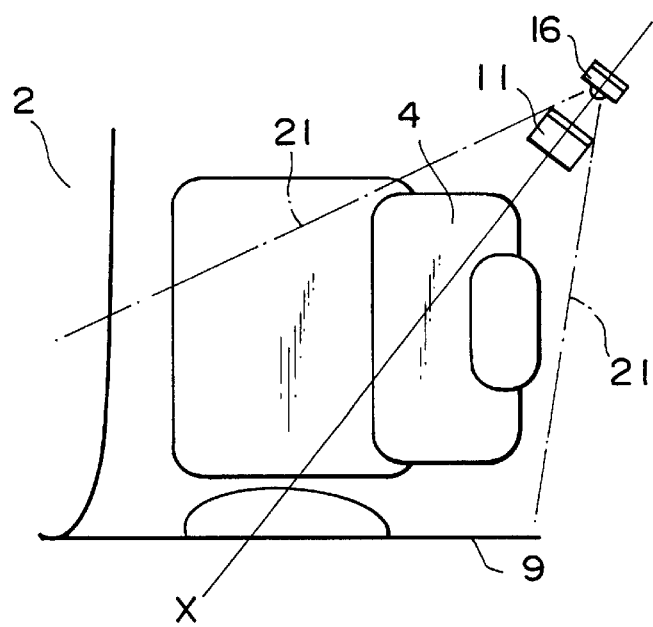
FIG. 2 is a top view showing the schematic structure of the occupant protecting apparatus according to the first embodiment of the invention.
Figure 5:
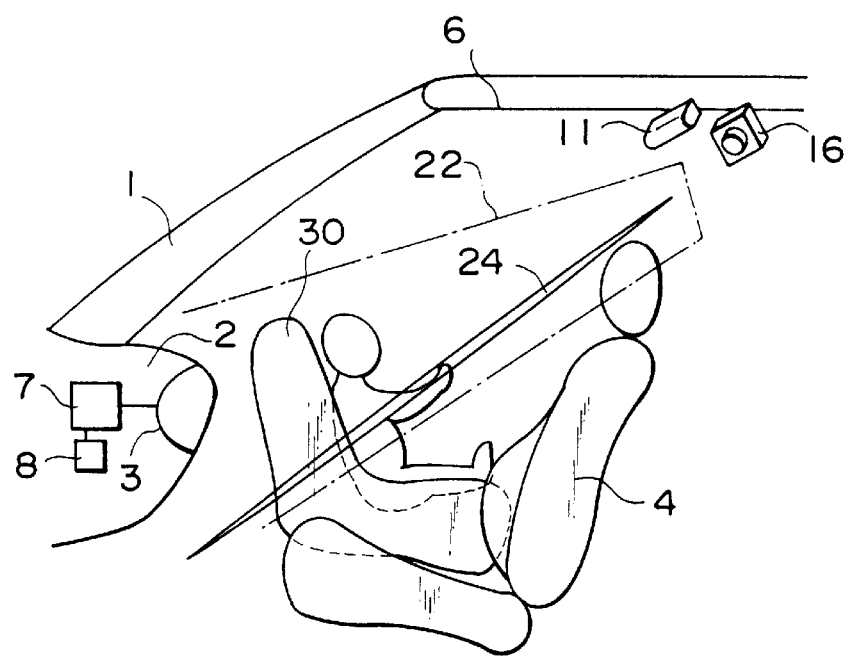
FIG. 5 is an explanatory view of operation for showing a case in which a vehicle having a child seat on the passenger seat is provided with the occupant protecting apparatus according to the first embodiment of the invention.
Figure 6:
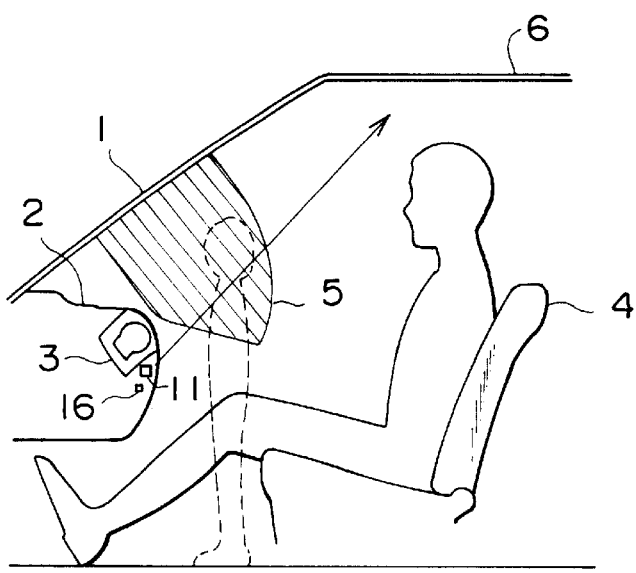
FIG. 6 is a side view showing a schematic structure of a conventional occupant protecting apparatus.

FIG. 1 is a side view of an occupant protecting apparatus according to a first embodiment of the present invention disposed on the side of a passenger seat, and FIG. 2 is a top view thereof. In these drawings, the same or similar members as those shown in FIG. 5 showing the above conventional technique are designated with the same reference numbers.

In FIG. 1, a vehicle such as an automobile includes a window shield 1, a dashboard 2, a passenger seat 4 and a passenger-side door 9. Accommodated in the dashboard 2 are an air bag 3 for passenger seat front collision, an electronic control unit (ECU) 7 for controlling the deployment of the air bag 3, an acceleration sensor 8 for detecting acceleration of the vehicle. The ECU 7 detects collision of the vehicle when acceleration of the vehicle detected by the acceleration sensor 8 exceeds a predetermined value. An infrared beam spotlight 11 for emitting infrared beam sheet is provided on a ceiling 6 at left side of and in front of a central room lamp such that the infrared beam spotlight 11 is directed downward into a left and forward direction. A two-dimensional image sensor 16 as a infrared beam detecting means is provided on the ceiling 6 at right side of and behind the room lamp such that the image sensor 16 is also directed downward into a left and forward direction. Output of the image sensor 16 is input to the i7. The infrared beam spotlight 11 includes an anamorphic optical system (not shown) using a cylindrical lens.

Next, operation of the first embodiment will be explained. Infrared beam emitted from the infrared beam spotlight 11 is shaped into such a sheet-like form that its vertical width with respect to the occupant's room is narrow and the sheet spreads in lateral direction in a form of a fan. When there is no passenger in the passenger seat, the infrared beam reaches the passenger-side door 9 and forms a liner infrared beam spot 24 thereon. Since the infrared beam spotlight 11 is inclined as illustrated, the infrared beam spot 24 becomes an oblique line. A chain line 21 indicates an angle of view of the image sensor 16, and a range surrounded by a chain line 22 indicates an image range at a position of the passenger-side door 9. Since a distance from a front portion of the passenger-side door 9 to the image sensor 16 is long, a vertical image range at that position is wider than an image range in the vertical direction at a position behind the passenger-side door 9.

Like many sensors of this type, the infrared beam spotlight 11 blinks in synchronization with exposure timing of the image sensor 16, and the invention uses a so-called synchronous wave-detecting technique in which by detecting a difference between output of the image sensor 16 in a state in which the infrared beam spotlight 11 emits and output of the image sensor 16 in a state in which the infrared beam spotlight 11 shuts off, only infrared beam spot formed by the infrared beam spotlight 11 is detected without being influenced by disturbance light even if the disturbance light is great.

Figure 3:
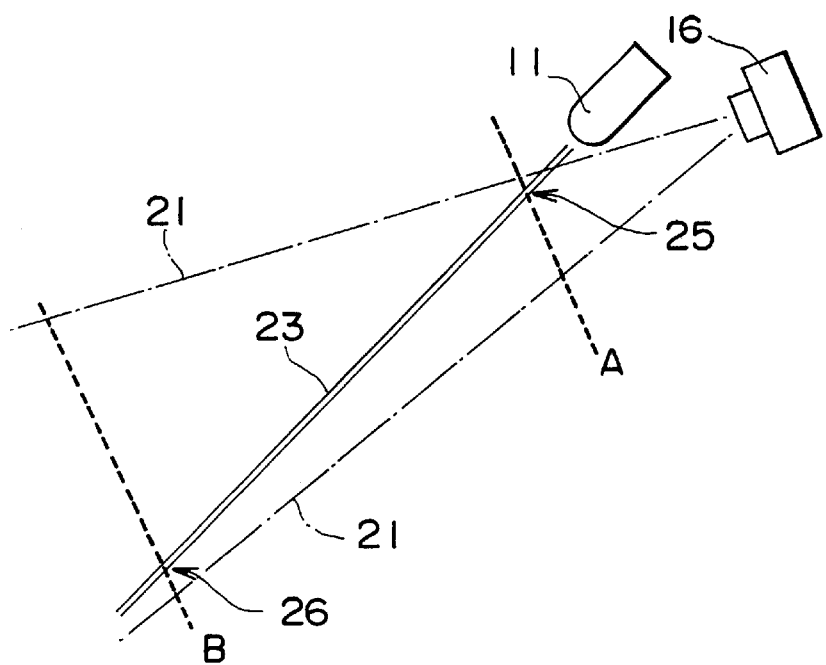
FIG. 3 is a top view showing an optical system of the occupant protecting apparatus according to the first embodiment of the invention.

FIG. 3 is a sectional view taken along a line X (a line passing through a center of each of the infrared beam spotlight 11 and the image sensor 16). In FIG. 3, an infrared beam sheet 23 extends without spreading in the vertical direction such that the infrared beam sheet 23 crosses an angle of view 21 in the vertical direction of the image sensor 16 from above to below. When an object to be detected exists at a point A near the image sensor 16, an infrared beam spot 25 generated by the object to be detected is observed near an upper end of the image range, and when the object exists at a point B far from the image sensor 16, an infrared beam spot 26 generated by the object to be detected is observed near a lower end of the image range. Therefore, the ECU 7 can obtain a distance (a distance from the image sensor 16) from a vertical position of the observed infrared beam spot. Since a spacial position of the infrared beam sheet 23 is already known and a distance from the image sensor 16 to the object to be detected can be obtained, the ECU 7 can obtain a three-dimensional shape of the infrared beam spot.

In reality, since variations in vertical position of the observed infrared beam spot is small, analysis ability of the distance detection is enhanced by reducing the angle of view in the vertical direction. On the other hand, since a range in which the object to be detected can exists in the horizontal direction is wide, the angle of view in the vertical direction is set narrow and the angle of view in the horizontal direction is set wide by means of anamorphic optical system.

When an adult sits on the passenger seat and when a child sits on a high child seat, the infrared beam spot is generated on a side face of the occupant. A head of a human definitely moves slight during a long time period, and it is possible to distinguish the head from a stationary object such as a headrest. A visual angle of the infrared beam spot is detected by the image sensor 16, the visual angle is corrected using distance information obtained by the above method, and the ECU 7 can obtain an actual width of the side face. It is possible to judge whether the occupant is adult or child from the width of the side face. That is, when the detected width of the side is equal to or greater than a predetermined value, it is judged that the occupant is an adult, and when the width is smaller than the predetermined value, it is judged that the occupant is a child. When the occupant is child, since it is danger to deploy the air bag 3 even if the collision occurs, the ECU 7 does not open the air bag 3 or tries to open the air bag 3 with a weak force.

Figure 4:
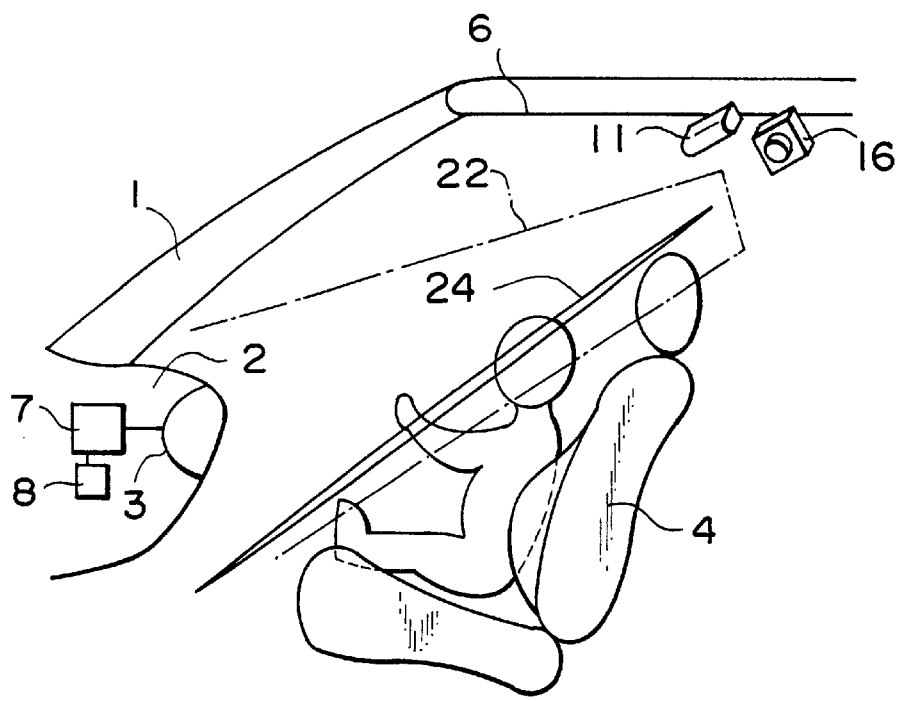
FIG. 4 is an explanatory view of operation for showing a case in which a child sits on a passenger seat of a vehicle provided with the occupant protecting apparatus according to the first embodiment of the invention.

When no occupant exists or when a child of low sitting height (lower than a predetermined height) sits on the passenger seat 4 as shown in FIG. 4, the infrared beam sheet 23 does not impinge on the occupant or impinges only on a tip end of the head, and it is judged that the width of the side face is small. Therefore, the ECU 7 judges that no one is sitting or a child is sitting, and the ECU 7 does not open the air bag 3 or tries to open the air bag 3 with a weak force.

When existence of occupant is detected at a position extremely close to the air bag 3 (within a first predetermined distance), since it is danger to deploy the air bag 3, the ECU 7 does not open the air bag 3 irrespective of a physique.

When existence of occupant is detected at a position slightly close to the air bag 3 (distance greater than the first predetermined distance and equal to or smaller than a second predetermined distance), the ECU 7 judges that it is danger to strongly deploy the air bag 3 but it is necessary to deploy the air bag 3, and when the acceleration sensor 8 detected a collision, the ECU 7 controls to deploy the air bag 3 with a weak force.

Since the three-dimensional position of the head of the occupant is obtained as described above, the ECU 7 can be used not only for judging whether the air bag 3 should be deployed but also for judging whether a side air bag should be deployed. When the occupant's position is too close to the side air bag (not shown), the ECU 7 judged that it is danger to strongly deploy the side air bag, and even if the acceleration sensor 8 detects a side collision, the ECU 7 does not deploy the side air bag or deploys the same with a weak force.

The ECU 7 monitors motion of the infrared beam spot, and when the ECU 7 detects existence of a stationary object having size equal to or greater than a certain level that does not move on the infrared beam sheet, the ECU 7 judges that the child seat is fixed. For example, when the child seat 30 shown in FIG. 5 is fixed, since it is extremely danger to deploy the air bag 3, the ECU 7 does not deploy the air bag 3.

Second Embodiment

Although the infrared beam spotlight 11 emits infrared beam in the form of a sheet in the above first embodiment, the infrared beam spotlight 11 may emit the infrared beam in a form of a plurality of sheets. It is difficult to detect an occupant's head depending upon sitting height of the occupant or position of the seat with one infrared beam sheet depending upon vehicle type. Therefore, if the infrared beam is emitted in the form of the plurality of sheets, it is possible to enlarge the detectable range. Further, since fine three-dimensional shape can be obtained, it is possible to estimate physique of the occupant more reliably.

Third Embodiment

In the first embodiment, only static size or position of the occupant is detected by the image sensor 16, and occurrence of the collision is detected based on the output of the acceleration sensor 8. In order to deploy the air bag 3 at an early stage, it is preferable to complete the judgment of collision as soon as possible after the collision. However, if the collision is judged only from the acceleration signal within a short time, a malfunction occurs due to reason other than collision such as run on a step. Therefore, in order to enhance the reliability of the collision detection ability, it is common to use acceleration waveform for long time in some degree.

Therefore, it is possible to detect the motion of the occupant from real time image of the image sensor 16 and to use the detected value for auxiliary purpose of collision detection, or to detect the occurrence of collision only from the image.

A collision sensor for air bag control needs to detect a collision within 10 to 15 ms. Thus, when a collision is judged using the acceleration sensor 8, acceleration waveform of full time within this time is used for judgment. In order to detect a collision by the infrared beam spotlight 11, it is necessary to observe using at least two frames within this time period, i.e., 200 fps (Frame Per Second) or more, and more preferably, at frame rate of 1000 fps or greater. However, a general two-dimensional image sensor uses a large number of pixels, it is difficult to realize such a high speed frame rate.

Thereupon, in the third embodiment, a CMOS type image sensor having a projection function is used as the image sensor 16. The projection function is a function for collectively outputting total value of all the brightness values of pixels in y-direction for each row of pixels in x-direction in the image sensor having two-dimensional pixels in the x- and y-directions, instead of outputting all the brightness values of all the pixels like a common two-dimensional image sensor, i.e., the projection function is a function capable of operating as a one-dimensional image sensor. For example, when an image sensor of 32×32 dots, it is usually necessary to output brightness values of all the 1024 pixels, but when the projection function is used, it is only necessary to output one brightness value for each row in the x-direction, and total 32 brightness values. Therefore, it is possible to realize an extremely high speed frame rate higher than 1000 fps, and this can be used as the collision sensor.

At normal time, the image sensor 16 functions to detect a static position of an occupant like the first embodiment, and from the instant when the longitudinal acceleration sensor 8 detects acceleration equal to or greater than a certain value, the image sensor 16 functions as the high speed one-dimensional image sensor in the x-direction using the projection function, and when the lateral acceleration sensor 8 detects acceleration equal to or greater than a predetermined value, the image sensor 16 functions as high speed one-dimensional image sensor to play auxiliary role of the collision sensor. That is, when the vehicle acceleration detected by the acceleration sensor 8 is equal to or greater than the predetermined value and a longitudinal motion (moving speed) of the occupant detected by the image sensor 16 is equal to or greater than the predetermined value, it is judged that the vehicle collided. Further, also in the third embodiment, like the first embodiment, disturbance light influence is prevented using the synchronous wave-detecting technique. With this assistance, it is possible to reliably judge a collision at earlier stage than judgment of a collision only from output of the acceleration sensor 8.

Further, since it is possible to observe motion of an occupant at the instant of collision in real time in the third embodiment, it is possible to control the air bag deployment more quickly. For example, when an occupant was within a range of a normal position immediately before a collision but since the occupant did not wear a seat belt and approached the dashboard 2 faster than expected (i.e., when variation ratio of distance between the occupant and the dashboard 2 exceeds a predetermined value), and when it is danger to deploy the air bag 3, it is possible to control the deployment of the air bag 3 safely.

In FIGS. 1 to 5, the infrared beam spotlight 11 and the image sensor 16 are separated at a great distance from each other to facilitate understanding, but in actual case, they may be close to each other or they may be integrally formed. If they are incorporated into the room lamp as one unit, they do not bother an occupant and it is preferable.

Although the infrared beam spotlight 11 in the first embodiment emits infrared beam in the form of sheet shape having wide width, a plurality of infrared beam set arranged in the form of the sheet, or infrared beam for scanning in the sheet form may be used, and the same effect can be exhibited.

Although one set of he infrared beam spotlight 11 and infrared beam detecting means such as the image sensor 16 is used to detect a position of one occupant in the first embodiment, a plurality of sets of the infrared beam spotlight 11 and the infrared beam detecting means may be used for taking the wisest measure against trouble.

The air bag deployment control apparatus for a passenger seat is described in the first embodiment, the present invention can be likewise applied as a motion control apparatus of protecting means at the time of collision for other occupants.

What is claimed is:

1. An occupant protecting apparatus comprising:

infrared beam emitting means disposed on an upper portion of an occupant room of a vehicle at a position diagonally rearward of a position of a passenger seat for emitting a flat infrared beam, infrared beam detecting means disposed on a position offset from said infrared beam emitting means for detecting a position of a light spot generated in such a manner that said infrared beam impinges on an occupant on a seat and scatters, and control means for obtaining a size of said occupant or a three-dimensional shape of a sitting position from output of said infrared beam detecting means to control motion of an air bag protecting apparatus.

2. An occupant protecting apparatus according to claim 1, wherein said infrared beam emitting means is disposed on a ceiling of the vehicle in the vicinity of a room lamp diagonally rearward of a head position of an occupant on a driver's seat or a passenger seat.

3. An occupant protecting apparatus according to claim 1, wherein said infrared beam emitting means emits a flat infrared beam sheet, a set of a plurality of an infrared beams arranged in a form of a sheet or infrared beam that scans in a form of a sheet.

4. An occupant protecting apparatus according to claim 1, wherein said infrared beam detecting means comprises a two-dimensional image sensor disposed on a position offset from said infrared beam emitting means in order to detect the position of the light spot generated in such a manner that said infrared beam sheet or beam impinges the occupant on the seat and scatters.

5. An occupant protecting apparatus according to claim 1, wherein said infrared beam emitting means includes an anamorphic optical system.

6. An occupant protecting apparatus according to claim 1, wherein said control means judges whether the occupant is an adult or a child from the size of the head of the occupant detected by said infrared beam detecting means.

7. An occupant protecting apparatus according to claim 4, wherein said control means judges whether an object is a stationary object such as a child seat from presence or absence of motion of the light spot on said object.

8. An occupant protecting apparatus according to claim 3, wherein said infrared beam emitting means can emit a flat infrared beam sheet, a set of a plurality of infrared beams arranged in a form of a sheet or an infrared beam that scans in a form of a sheet to a plurality of vertical positions.

9. An occupant protecting apparatus according to claim 3, wherein said infrared beam detecting means includes an image sensor having a frame rate of 200 frames per second or greater in order to detect the position of the light spot generated in such a manner that said infrared beam sheet or beam impinges the occupant on the seat and scatters.

10. An occupant protecting apparatus according to claim 9, wherein said infrared beam detecting means comprises a two-dimensional CMOS image sensor having a projection function.

11. An occupant protecting apparatus according to claim 10, wherein said two-dimensional CMOS image sensor functions as a one-dimensional image sensor using said projection function when acceleration of said vehicle exceeds a predetermined value.

12. An occupant protecting apparatus according to claim 1, wherein said control means detects a collision state from longitudinal motion of said occupant detected by said infrared beam detecting means at an instant when a front collision of said vehicle occurs.

13. An occupant protecting apparatus according to claim 1, wherein said control means detects a collision state from lateral motion of said occupant detected by said infrared beam detecting means at an instant when a side collision of said vehicle occurs.

* * * * *